(12) United States Patent
McAndrew et al.

(10) Patent No.: US 9,029,458 B2
(45) Date of Patent: May 12, 2015

(54) PROCESS AND PERFORMANCE AID FOR CARBON NANOTUBES

(75) Inventors: Thomas P. McAndrew, Limerick, PA (US); Christophe Roger, Limerick, PA (US); Emily Bressand, Aachen (DE); Pierre Laurent, Villeurbanne (FR)

(73) Assignee: Arkema Inc., King of Prussia, PA (US)

( * ) Notice: Subject to any disclaimer, the term of this patent is extended or adjusted under 35 U.S.C. 154(b) by 792 days.

(21) Appl. No.: 12/524,932

(22) PCT Filed: Feb. 28, 2008

(86) PCT No.: PCT/US2008/055212
§ 371 (c)(1),
(2), (4) Date: Jan. 28, 2010

(87) PCT Pub. No.: WO2008/106572
PCT Pub. Date: Sep. 4, 2008

(65) Prior Publication Data
US 2010/0210781 A1    Aug. 19, 2010

Related U.S. Application Data

(60) Provisional application No. 60/892,302, filed on Mar. 1, 2007.

(51) Int. Cl.
*C08K 3/04* (2006.01)
*C08J 5/00* (2006.01)
*B82Y 30/00* (2011.01)

(52) U.S. Cl.
CPC . *C08J 5/005* (2013.01); *B82Y 30/00* (2013.01)

(58) Field of Classification Search
CPC .................................. C08J 5/005; B82Y 30/00
USPC ........................................................... 524/495
See application file for complete search history.

(56) References Cited

U.S. PATENT DOCUMENTS

| | | | |
|---|---|---|---|
| 2003/0125478 A1* | 7/2003 | Mari Beek et al. | 525/397 |
| 2005/0186378 A1 | 8/2005 | Bhatt | |
| 2006/0067055 A1* | 3/2006 | Heffner et al. | 361/704 |
| 2006/0148963 A1* | 7/2006 | Dion et al. | 524/495 |
| 2006/0210466 A1 | 9/2006 | Mitra et al. | |
| 2006/0274049 A1* | 12/2006 | Spath et al. | 345/173 |

FOREIGN PATENT DOCUMENTS

| | | |
|---|---|---|
| JP | 2006-063307 A | 3/2006 |
| WO | WO 2004/040590 A2 | 5/2004 |
| WO | WO 2004/058872 A1 | 7/2004 |
| WO | WO 2007/011684 A2 | 1/2007 |
| WO | WO 2007011684 A2 * | 1/2007 |

* cited by examiner

*Primary Examiner* — Ling Choi
*Assistant Examiner* — Lanee Reuther
(74) *Attorney, Agent, or Firm* — Steven D. Boyd (57) ABSTRACT

A polymer composition which includes carbon nanotubes in a resin matrix such as cyclic butylene terephthalate where the resin matrix is compounded into a polymer matrix. The carbon nanotube resin matrix is compatible in a wide variety of polymer matrixes having many end uses. The resin matrix provides good compatibility with many polymer systems, e.g., polyamides, polyesters, acrylics and is easy to use exhibiting a low melting point and low viscosity in melt and provides for a polymer matrix having good properties, including a higher electrical conductivity and/or increased mechanical properties.

10 Claims, 5 Drawing Sheets

PROCESS AND PERFORMANCE AID FOR CARBON NANOTUBES

The present application claims benefit of International Patent Application Serial Number PCT/US2008/055212, filed Feb. 28, 2008, which designated the United States, and U.S. Provisional Patent Application Ser. No. 60/892,302 filed Mar. 1, 2007.

FIELD OF THE INVENTION

The present invention relates to a process and performance aid for carbon nanotubes which enhances the handling and processing of carbon nanotubes in preparing a variety of carbon nanotube containing polymer matrixes which exhibit improved performance, including but not limited to electrical conductivity and mechanical properties.

BACKGROUND OF THE INVENTION

There is significant worldwide interest in carbon nanotubes (multi walled, double walled, single walled). Nanotubes are known to be composed either of a single sheet, in which case they are called single-walled nanotubes (SWNTs), or made up from several concentric sheets, when they are called multi-walled nanotubes (MWNTs). Carbon nanotubes can be formed from petroleum-based sources or form biological-based sources.

However, there are concerns with ease of handling and processing. One approach to address this is to deliver carbon nanotubes encapsulated in a resin matrix. Since the carbon nanotubes are not free, but encapsulated, handling is improved. And since carbon nanotubes are already dispersed to varying degrees, subsequent dispersion in a resultant polymer composition should be more efficient.

In addition, demand and applications for electrically conductive plastics and plastics with modified mechanical properties have grown. In these uses, one seeks to exploit the unique properties of plastics, often as an alternative to metals. For example, electrically conductive polymeric materials are desirable for many applications including coatings for the dissipation of electrostatic charge from electrical parts, and the shielding of electrical components to prevent interference by electromagnetic waves. Enhanced electrical conductivity in polymer materials enables coating by electrostatic spray painting. The primary methods of increasing the electrical conductivity of plastics have been to fill them with conductive additives such as metallic powders, metallic fibers, intrinsically conductive polymeric powder, e.g., polypyrrole, or carbon black. The most common method involves carbon black. However, each of these approaches has some shortcomings. Metallic fiber and powder enhanced plastics have diminished mechanical strength. Further, cost is high and their density makes high weight loadings necessary. Intrinsically conductive polymers have high costs and are often not stable in air. Thus, their use is frequently impractical. It has been recognized that the addition of carbon nanotubes to polymers in quantities less than that of carbon black can be used to produce conductive end products and/or to modify the mechanical properties of the product.

Encapsulation of carbon nanotubes is known. Multi-walled carbon nanotubes (MWCNT's) are marketed as nanotubes compounded in a resin matrix. The resin matrix is formed depending upon customer needs. For example, if the customer is interested in compounding MWCNT's into polyamide-6, a resin matrix of carbon nanotubes in polyamide-6 is prepared. The MWCNT's concentration in such matrixes typically ranges from approximately 2% to approximately 20%. These matrices are called master batches. This process requires a distinct master batch for each end use. Such a process is costly and inefficient.

SUMMARY OF THE INVENTION

The present invention is directed toward carbon nanotubes encapsulated into a resin matrix and a polymer composition which incorporates carbon nanotubes encapsulated into a resin matrix. The resin matrix comprises chains containing aromatic groups, oxygen and/or nitrogen atoms, has a low melting temperature, and a molecular weight such that melt viscosity is low. A preferred resin matrix is cyclic butylene terephthalate. The carbon nanotube resin matrix is compatible in a wide variety of polymer compositions which have a variety of end uses. The resin matrix of the present invention enables easier handling, provides good compatibility with many thermoplastic and thermoset polymer systems, e.g., polyamides, polyesters, polycarbonates, acrylics, chloropolymers, fluoropolymers, epoxies, etc. and is easy to use exhibiting a low melting point and low viscosity in melt and is low in cost. The incorporation of the resin matrix into the polymer composition also provides higher electrical conductivity and/or improved mechanical properties. It has now been discovered that a variety of polymer composites containing a resin matrix of cyclic butylene terephthalate and carbon nanotubes display higher electrical conductivity than the analogous composites absent cyclic butylene terephthalate. It has also been discovered that the mechanical properties of a variety of polymer composites can be modified by incorporating therein a resin matrix encapsulating carbon nanotubes, such as cyclic butylene terephthalate and carbon nanotubes. Thus, the present invention provides a single resin matrix encapsulating carbon nanotubes which can be used in a variety of polymer compositions to modify mechanical properties and/or electric conductivity.

DESCRIPTION OF THE INVENTION

The present inventors discovered that incorporation of carbon nanotubes into a resin matrix simplifies melt processing in polymer matrixes and/or addition into polymer matrixes and provides a polymer matrix having higher electrical conductivity and/or improved mechanical properties. Generally the resin matrix comprises chains containing aromatic groups, oxygen and/or nitrogen atoms, has a low melting temperature (less than about 200° C.), and a molecular weight such that melt viscosity is low (less than about 5000 centipoise). A preferred resin matrix is cyclic butylene terephthalate (CBT). The concentration of carbon nanotubes in the resin matrix is preferably between about 0.1 and 50% by weight, more preferably between about 5 and 33% by weight and most preferably about 25% by weight. Unless otherwise specified, all percentages herein are percentages by weight and all temperatures are in degrees Centigrade (degrees Celsius).

The use of carbon nanotubes in polymer technology is very important. One reason is that carbon nanotubes can increase the electrical conductivity of a polymer matrix at relatively low concentration. In many cases, less than 5% by weight, and often less than 2% by weight. This makes the polymer matrix suitable for numerous applications, such as electrostatic painting, static charge dissipation, and electromagnetic interference shielding. Metals can be used in these applications, but conductive polymers offer a lower-cost, lighter-weight, alternative. Carbon black can provide a conductivity effect in polymers. However, with carbon black, much higher concentrations are required, typically 10-20% by weight. Such a level of additives, while providing good electrical conductivity, reduces other properties of the polymer, such as mechanical strength, impact resistance, gas/liquid permeability, etc. Carbon nanotubes provide good electrical conductivity while also maintaining other desirable polymer properties. Some examples of applications where a polymer/nanotube composition could be advantageous are: conductive polymer fuel handling components of automobiles, electrostatically paintable thermoplastic automotive body/interior components, coatings to shield electronic equipment, etc.

Another property of importance in the use of carbon nanotubes is an increase in mechanical properties of a polymer matrix at a relatively low concentration of carbon nanotubes. This makes the polymer matrix suitable for applications where otherwise, heavier, more expensive materials are needed, such as metals. Some examples of carbon nanotube—containing composites are tennis rackets, baseball bats, golf clubs, bicycle components and possibly automotive and aeronautical components.

Still more applications for carbon nanotube containing composites, with carbon nanotubes properly dispersed in a polymer matrix include, but are not limited to: membranes employed for selective separation of gases, composites displaying enhanced flame retardancy, coatings or composites showing enhanced resistance to UV degradation, coatings showing enhanced absorption of visible light, coatings and composites showing enhanced wear resistance, coatings showing enhanced scratch resistance, coatings and composites having enhanced chemical resistance to dissolving/swelling agents, composites in which stress/strain/defects can be detected easily, composite acoustic sensors and actuators, electrode materials in capacitors, fuel cells, rechargeable batteries, electrically conductive and injury-resistant fabric, composites in a variety of electronic devices, such as glucose sensors, LED displays, solar cells, pH sensors Cyclic butylene terephthalate is a monomer of polybutylene terephthalate. The monomer and polymer are depicted below. Cyclic butylene terephthalate is non-hazardous and is compatible with a wide variety of thermoplastic and thermoset polymers where incorporation of carbon nanotubes may be desirable such as polyamides, polyesters, polycarbonates, polyacrylics, polyolefins, chloropolymers, fluoropolymers, and epoxies etc. Cyclic butylene terephthalate is easy to use, having a low melting point (150° C.) and viscosity in melt which is low, like water.

Structure of Cyclic Butylene Terephthalate—Monomer and Resultant Polymer

The carbon nanotube in cyclic butylene terephthalate resin matrix can be prepared by an evaporation process where the carbon nanotubes are dispersed in a liquid medium such as a solvent, such as by stirring and/or sonication, followed by dissolution of cyclic butylene terephthalate in the medium, followed by evaporation of the liquid medium. This process or any other suitable process forms a resin matrix of carbon nanotubes in a matrix of cyclic butylene terephthalate. This resin matrix can be mixed with a polymer matrix via conventional processes such as mixing in an extruder or any other suitable process. Heating can be provided with microwave heating equipment. Alternatively, the carbon nanotube in cyclic butylene terephthalate resin matrix can be prepared by direct melt mixing of carbon nanotubes on melt mixing equipment.

In melt mixing of the carbon nanotubes with the resin matrix, the work applied during mixing can impact the physical properties of the final polymer composition. Over working during the melt mixing can decrease the desirable changes in conductivity and/or mechanical properties provided by the present invention. The amount of working applied during melt mixing is a function of the equipment being used and its operating conditions such as: the temperature, screw speed and mixing time. In the examples below, the inventors found that an upper limit on mixing was provided in a DSM Research B.V MIDI 2000 twin screw extruder having a 15 $cm^3$ capacity when the temperature was about 150° C. or greater, at a screw speed of 100 rpm or less and a mixing time of 10 minutes or less. Providing working about or less than these parameters is preferred. Preferred operation parameters were temperature about 200° C. at a screw speed of 25 rpm and a mixing time of about 2 to 3 minutes. Based upon these parameters, a person skilled in the art could determine the desired conditions for other extruding equipment to avoid over working and degrading the desirable properties provided the present invention.

Polymer matrixes incorporating a resin matrix of carbon nanotubes in cyclic butylene terephthalate have been found to exhibit enhanced electrical conductivity, a low percolation threshold and enhanced mechanical properties. The concentration of carbon nanotubes in the polymer composition can range from about 0.01 to 25% by weight, preferably from about 0.1 to 10%, more preferably from about 0.5 to 5% and most preferably from about 1 to 3%.

Figure 3:
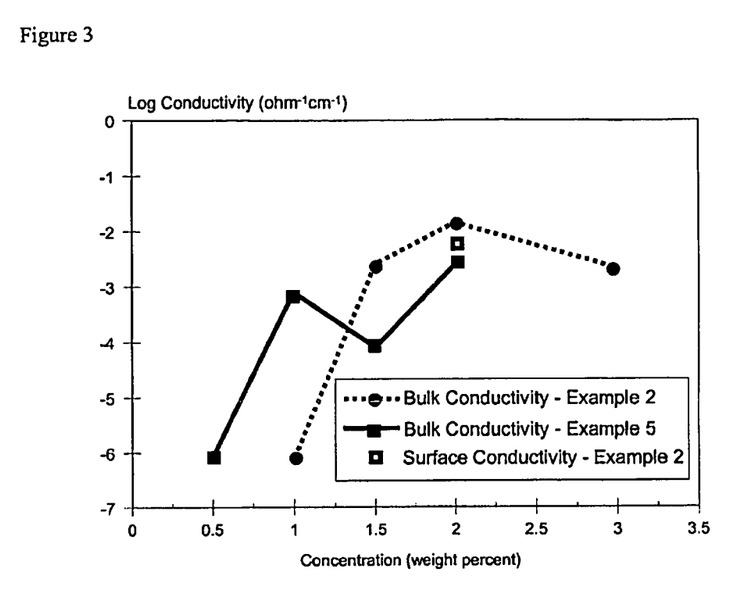
FIG. 3 is a graph of bulk and surface electrical conductivity as a function of carbon nanotubes concentration in a carbon nanotubes/cyclic butylene terephthalate/PA-11 composite.

FIG. 3 shows bulk and surface electrical conductivity as a function of carbon nanotubes concentration for a matrix of carbon nanotubes/cyclic butylene terephthalate/PA-11 composite in accordance with the present invention. PA-11 is Rilsan™ BMNO PCG available form Arkema Inc. Measurement of conductivity was by simple 2-probe measurement. Note there is three parts cyclic butylene terephthalate for every one part carbon nanotubes. Silver paint was employed to ensure good contact.

Figure 4:
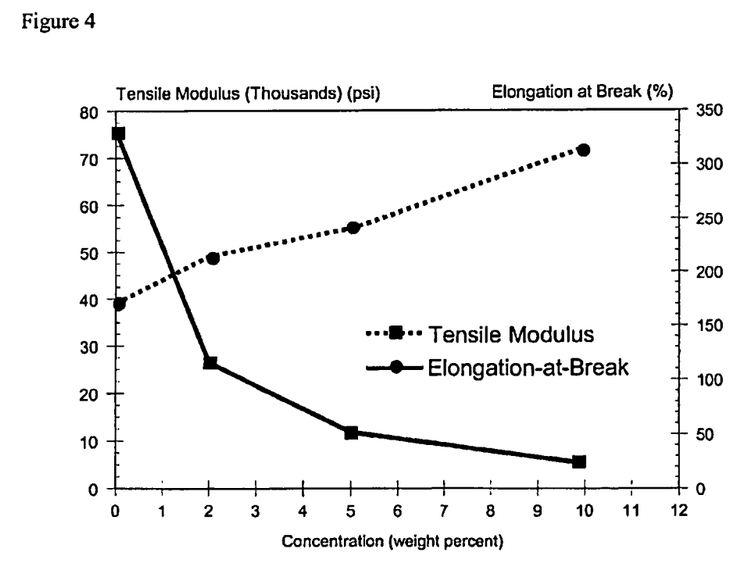
FIG. 4 is a graph of mechanical properties as a function of carbon nanotubes concentration in a carbon nanotubes/cyclic butylene terephthalate/PA-11 composite.

FIG. 4 shows mechanical properties as a function of carbon nanotube concentration for a matrix of carbon nanotubes/cyclic butylene terephthalate/PA-11 composite in accordance with the present invention. PA-11 is Rilsan™ BMNO PCG. The matrixes were prepared via melt mixing at 210° C. and injection molding was at 200° C. Note there is three parts cyclic butylene terephthalate for every one part carbon nanotubes.

Figure 5:
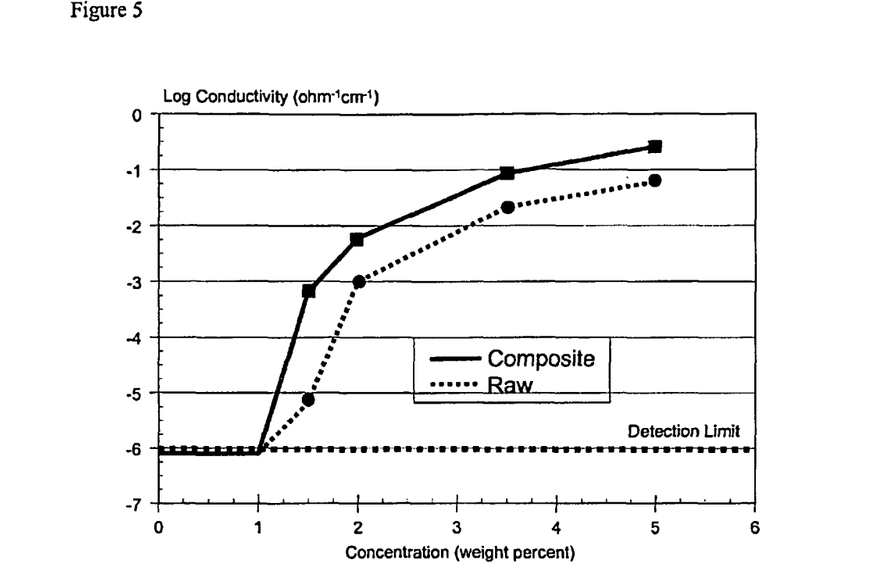
FIG. 5 is a graph of bulk electrical conductivity as a function of carbon nanotubes concentration in a carbon nanotubes/cyclic butylene terephthalate/polycarbonate matrix, and electrical conductivity as a function of carbon nanotubes concentration in a carbon nanotubes/polycarbonate matrix.

FIG. 5 shows bulk electrical conductivity as a function of carbon nanotubes concentration for a matrix of carbon nanotubes/cyclic butylene terephthalate/polycarbonate composite in accordance with the present invention. Preparation is according to Example 11. Also shown are same results for a polymer matrix of carbon nanotubes/polycarbonate. Polycarbonate is from Dow Chemical Co.—Water White. Measurement of conductivity was by simple 2-probe measurement. For composites containing cyclic butylene terephthalate, there were three parts cyclic butylene terephthalate for every one part carbon nanotubes. Silver paint was employed to ensure good contact.

Figure 6:
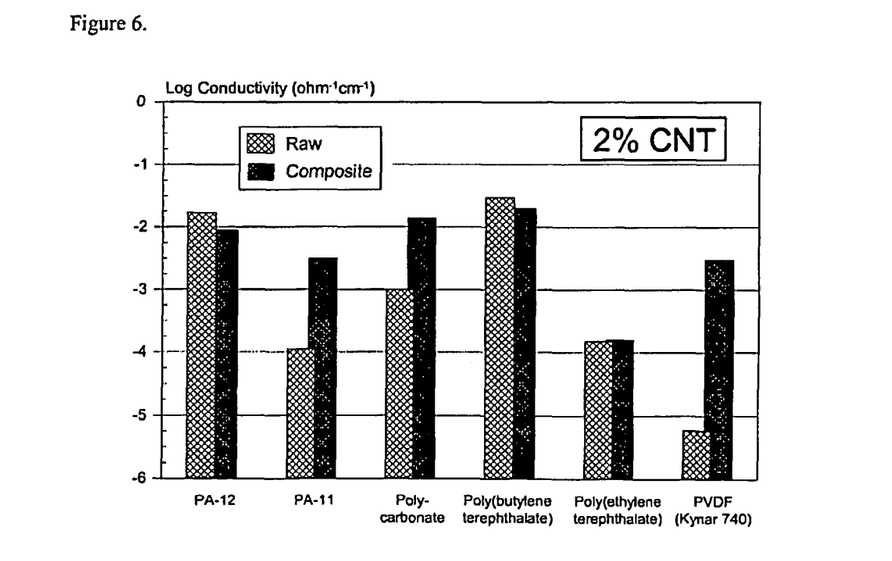
FIG. 6 is a graph of bulk electrical conductivity in several polymer compositions that comprise 2% carbon nanotubes—introduced as 25% carbon nanotubes/cyclic butylene terephthalate resin matrix or as plain carbon nanotubes.

FIG. 6 shows bulk electrical conductivity in several polymer matrices that comprise 2% carbon nanotubes—introduced as 25% carbon nanotubes/cyclic butylene terephthalate resin matrix, or as plain carbon nanotubes. Conditions are according to Example 9. Measurement of conductivity was by simple 2-probe measurement. For composites containing cyclic butylene terephthalate, there were three parts cyclic butylene terephthalate for every one part carbon nanotubes. Silver paint was employed to ensure good contact.

Figure 7:
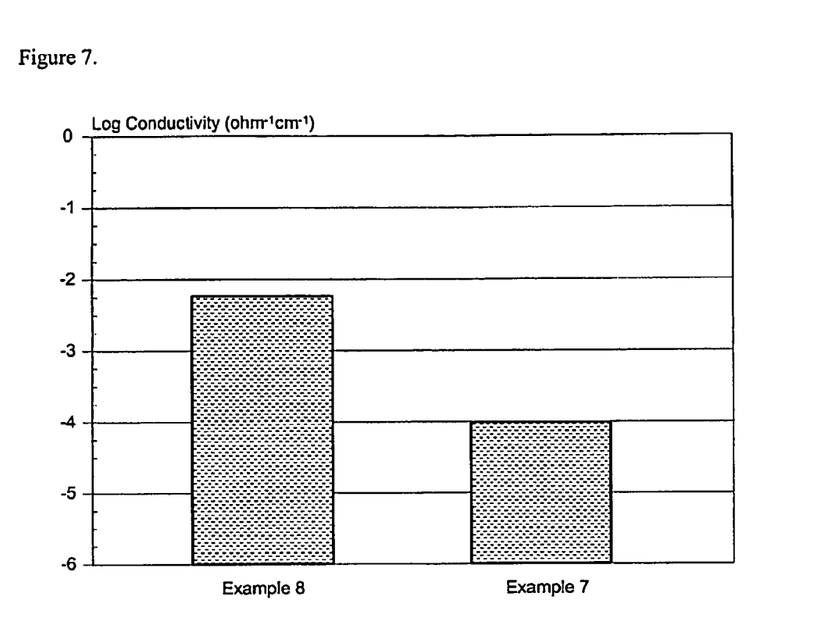
FIG. 7 is a graph of the effect of process conditions in preparation of carbon nanotubes/cyclic butylene terephthalate resin matrix on electrical conductivity of resultant polymer matrix in which said resin matrix is introduced.

FIG. 7 shows the effect of process conditions in the preparation of carbon nanotubes/cyclic butylene terephthalate resin matrix on the electrical conductivity of resultant polymer matrix in which said resin matrix is introduced. The polymer matrix was Polyamide-12 (Arkema Inc. Rilsan AMNO TLD). The conditions of preparation were as in Examples 7 and 8, and conditions of polymer matrix preparation were as in Example 10. Each comprised 2% carbon nanotubes—introduced as 25% carbon nanotubes/cyclic butylene terephthalate resin matrix. Measurement of conductivity was by simple 2-probe measurement. Silver paint was employed to ensure good contact.

Figure 8:
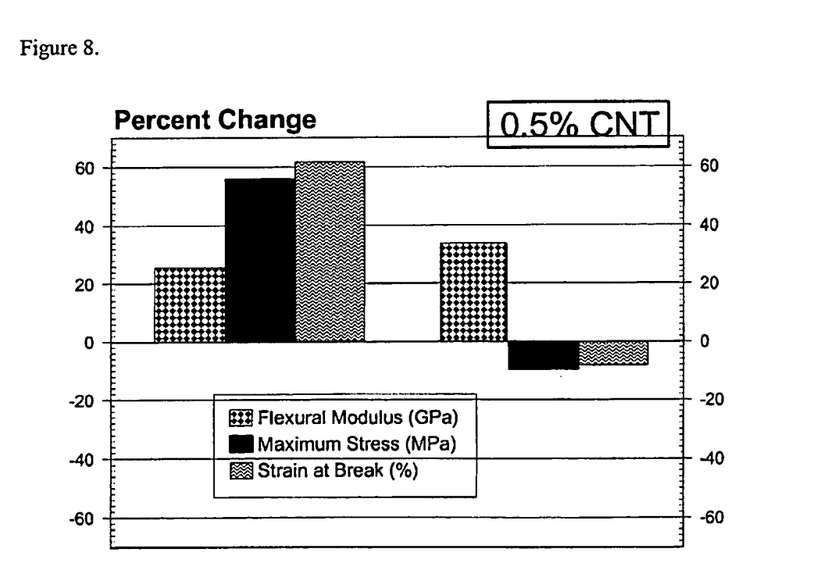
FIG. 8 is a graph of the effect of carbon nanotubes/cyclic butylene terephthalate resin matrix on mechanical properties of epoxy polymer matrix.

FIG. 8 is a graph of the effect of carbon nanotubes/cyclic butylene terephthalate resin matrix on the mechanical properties of an epoxy polymer matrix, and of said polymer matrices. Conditions were according to Example 11.

Figure 9A:
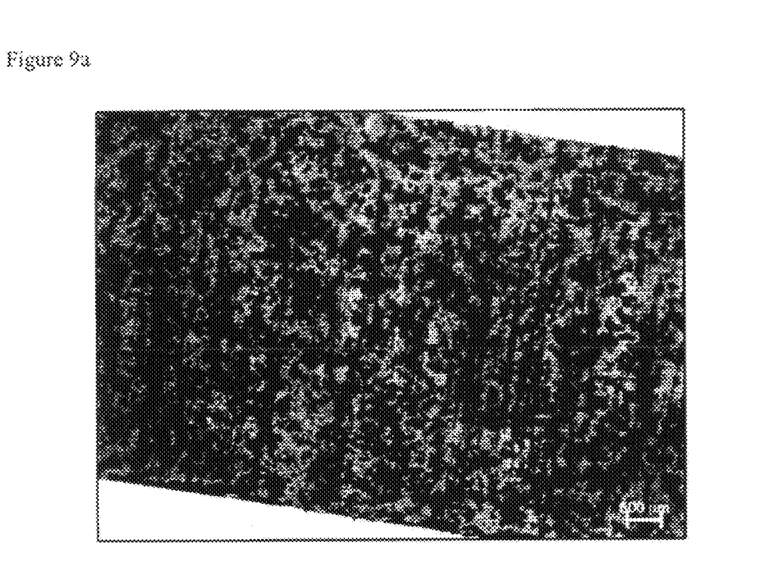
FIG. 9a is a transmission optical photograph of the epoxy matrix listed as "Composite" in FIG. 8.
Figure 9B:
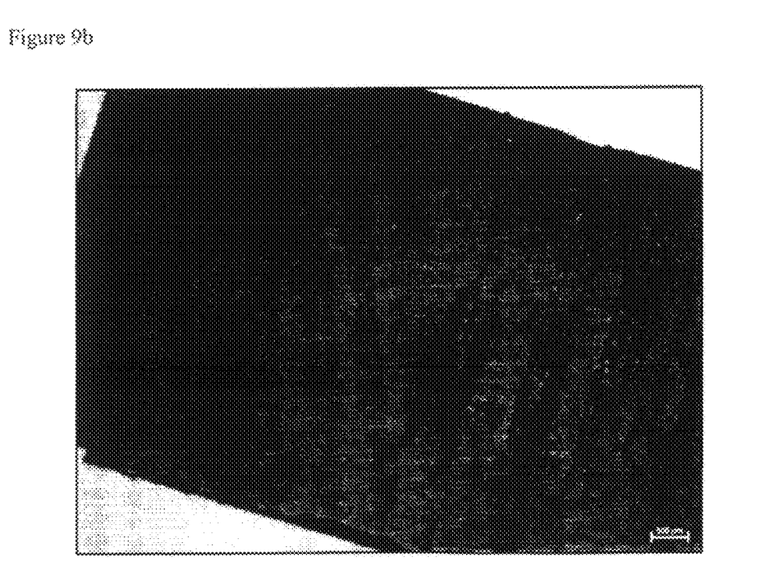
FIG. 9b is a transmission optical photograph of the epoxy matrix listed as "Plain CNT's" in FIG. 8.

FIGS. 9a and 9b are transmission optical microscope images of the epoxy polymer matrix with carbon nanotubes/cyclic butylene terephthalate of FIG. 8.

The following examples outline several methods of introducing carbon nanotubes into a cyclic butylene terephthalate matrix and/or into a polymer matrix.

EXAMPLES

Example 1

4.5 g of carbon nanotubes (Graphistrength® C100 available from Arkema France was used in all examples) were added to about 165 g of solution of cyclic butylene terephthalate in methylene chloride (9% by weight). This mixture was sonicated with a Sonics & Materials VC-505 unit set at 50% amplitude for about 2 hours. The resultant mixture was cast on aluminum foil and solvent allowed to evaporate. The resultant powder was about 20% by weight carbon nanotubes.

Example 2

21 g of carbon nanotubes were added to 800 g of methylene chloride. Sonication was performed with a Sonics & Materials VC-505 unit set at 50% amplitude for about 4 hours. Stirring was continuous with a magnetic stir bar. To this was added 64 grams of cyclic butylene terephthalate. Stirring on a roll mill was performed for about 3 days. The resultant mixture was cast on aluminum foil and solvent allowed to evaporate. The resultant powder is about 25% by weight carbon nanotubes.

Figure 1:
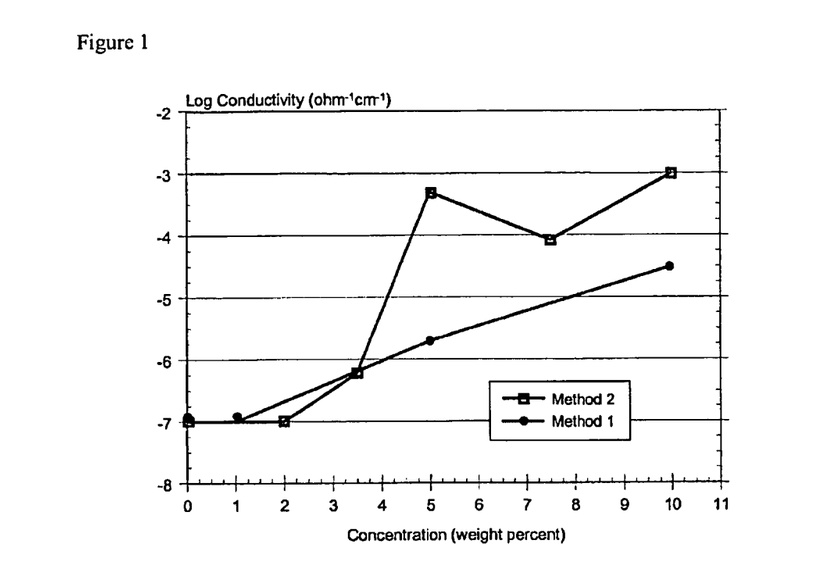
FIG. 1 is a graph of surface electrical conductivity as a function of carbon nanotube concentration in a carbon nanotubes/cyclic butylene terephthalate composite in cyclic butylene terephthalate.

Materials from Examples 1 and 2 were blended with fresh cyclic butylene terephthalate, and melt mixed on a DSM midi extruder. Parameters were: 150° C., 75 rpm for 10 minutes. In FIG. 1 is shown electrical conductivity as a function of carbon nanotubes concentration. Method 1 comprises use of material from Example 1. Method 2 comprises use of material from Example 2.

FIG. 1 shows the higher conductivity and lower percolation threshold for material made via Example 2 both advantageous properties. Measurement was by simple 2-probe measurement. The process of Example 2 is a preferred preparation method of carbon nanotubes/cyclic butylene terephthalate composites. Sonication prior to resin introduction is preferred.

Figure 2:
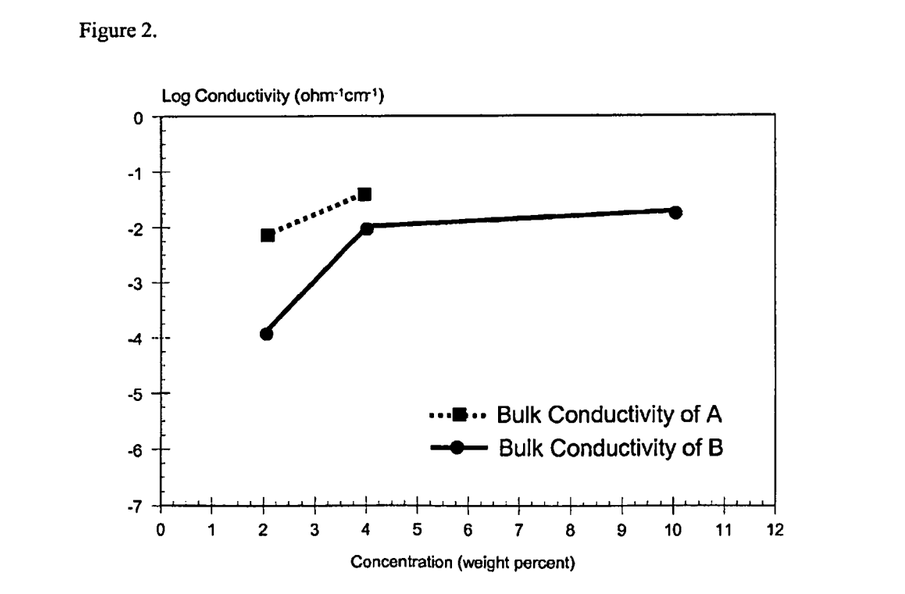
FIG. 2 is a graph of bulk electrical conductivity as a function of carbon nanotubes concentration in a carbon nanotubes/cyclic butylene terephthalate/PA-11 composite.

FIG. 2 shows the conductivity of carbon nanotubes/cyclic butylene terephthalate/PA-11 composite (line A), and carbon nanotubes/PA-11 composite (line B). PA-11 is Rilsan™ BMNO PCG available for Arkema Inc. Carbon nanotubes/cyclic butylene terephthalate composite was made according to Example 2. Measurement was by simple 2-probe measurement. Silver paint was employed to ensure good contact. Note that for line A, there is three parts cyclic butylene terephthalate for every one part carbon nanotubes.

The following examples outline methods of mixing carbon nanotubes into cyclic butylene terephthalate and/or polymer matrix.

Example 3

Cyclic butylene terephthalate was added to a round bottom flask and melted with a surrounding heating mantle. Carbon nanotubes already present were mixed in with a combination of stirring and sonication. Allowing cyclic butylene terephthalate to solidify resulted in a solid carbon nanotubes/cyclic butylene terephthalate composite.

Example 4

Cyclic butylene terephthalate and carbon nanotubes were placed into a tube and exposed to microwave radiation. Carbon nanotubes absorb microwaves which resulted in heating of the mixture and cyclic butylene terephthalate melting. Temperature went to about 170° C. and was held for about 15 minutes, with continuous stirring. The mixture was allowed to solidify resulting in a solid carbon nanotubes/cyclic butylene terephthalate composite.

Example 5

Cyclic butylene terephthalate and carbon nanotubes were mixed in dry form, then melt mixed in a DSM midi extruder (15 cm$^3$ capacity) at 150° C. The resultant product was a solid carbon nanotubes/cyclic butylene terephthalate composite comprising approximately 10% carbon nanotubes.

Example 6

The use of a carbon nanotubes/cyclic butylene terephthalate resin matrix to introduce carbon nanotubes into a polymer matrix was studied. The polymer chosen was polyamide-11. Specifically used were Rilsan® BMNO PCG available form Arkema Inc. Polyamides such as Polyamide-11 may be an important end use application for carbon nanotubes.

A carbon nanotubes/cyclic butylene terephthalate composite prepared in accordance with Example 2 was melt mixed with polyamide PA-11 in a DSM midi extruder for 10 minutes at 75 rpm at 285° C. The extrudate was captured. There were three parts cyclic butylene terephthalate for every one part carbon nanotubes. Therefore, the sample at 2% carbon nanotubes was 6% cyclic butylene terephthalate and 92% polyamide PA-11.

As comparison, raw carbon nanotubes were considered as well. Raw carbon nanotubes were melt mixed with PA-11 in the DSM midi extruder for 10 minutes at 75 rpm at 285° C. Extrudate was captured. Since there is no cyclic butylene terephthalate, the sample at 2% carbon nanotubes, was 98% PA-11.

One obvious benefit of cyclic butylene terephthalate is that it makes melt compounding of carbon nanotubes much easier. Experiments with raw carbon nanotubes were difficult. Those with cyclic butylene terephthalate were not. Mixtures of PA-11 and raw carbon nanotubes, as dilute as 0.5% carbon nanotubes, caused jamming of the extruder barrel. Though unexplained, phenomenologically, cyclic butylene terephthalate substantially aids the melt processing of carbon nanotubes. This provides the benefit of requiring less mechanical energy, and reducing the likelihood of jamming, and consequent process termination in extruder processes.

In FIG. 2, conductivity values achieved with cyclic butylene terephthalate are substantially higher, about 10-fold, than those without cyclic butylene terephthalate. This demonstrates the value of cyclic butylene terephthalate. Cyclic butylene terephthalate functions as a conductivity enhancer. Though not bound by this explanation, it is possible that cyclic butylene terephthalate enables better connectivity of carbon nanotubes, since at equivalent concentrations; better conductivity would be expected to result from better connectivity.

The conductivity values observed in FIG. 2 are high for carbon nanotubes in a resin system: $10^{-2}$ ohm$^{-1}$ cm$^{-1}$ at a concentration of only 2%. This indicates that percolation levels are low.

Further experiments were performed. Data from FIG. 2 indicated that percolation levels are low for the carbon nanotube/cyclic butylene terephthalate combination. This was confirmed. See FIG. 3. The percolation level for the carbon nanotube/cyclic butylene terephthalate/PA-11 system according to Example 2 is <1.5% carbon nanotubes. The percolation level for the carbon nanotube/cyclic butylene terephthalate/PA-11 system according to Example 5 is <1.0% carbon nanotubes. Note as well that conductivity measured on surface matches conductivity measured on bulk.

Mechanical properties of the inventive combination were also evaluated. Preliminary work was done with PA-11. See FIG. 4. Samples were prepared using carbon nanotubes/cyclic butylene terephthalate composite from Example 2. Melt mixing was in a DSM midi extruder for 10 minutes at 75 rpm at 210° C. Extrudate was captured, then injection molded at 200° C. to form materials for mechanical testing. The data shows the elastic modulus increases with increasing carbon nanotube concentration. This shows good compatibility among carbon nanotubes, cyclic butylene terephthalate and PA-11. If the compatibility were poor, elastic modulus would be expected to decrease.

Example 7

Cyclic butylene terephthalate and carbon nanotubes were mixed in dry form, then melt mixed in a DSM midi extruder (15 cm$^3$ capacity) at the following conditions—150° C., screw speed of 100 rpm, 10 minutes. The resultant product was a solid carbon nanotubes/cyclic butylene terephthalate resin matrix comprising 25% carbon nanotubes.

Example 8

Cyclic butylene terephthalate and carbon nanotubes were mixed in dry form, then melt mixed in a DSM midi extruder (15 cm³ capacity) at the following conditions—200° C., screw speed of 25 rpm, 2-3 minutes. The resultant product was a solid carbon nanotubes/cyclic butylene terephthalate resin matrix comprising 25% carbon nanotubes.

Example 9

Carbon nanotube/cyclic butylene terephthalate composite of Example 8 was melt compounded into a series of polymer matrices such that resultant carbon nanotube concentration was 2%. This was done on the DSM midi extruder at 100-150 rpm for 10 minutes. The following polymer matrixes were employed (listed as well temperature of processing):
Polyamide-12. Arkema Inc. Rilsan AMNO TLD—process temperature—285° C.
Polyamide-11. Arkema Inc. Rilsan BMNO PCG—process temperature—285° C.
Polycarbonate. Dow Chemical Co. Water White—process temperature—300° C.
Polyetheylene terephthalate. Crystalline polyethylene terephthalate from KOSA—process temperature—280° C.
Polybutylene terephthalate.—Colexer 2000-K from Ticona—process temperature—280° C.
Poly(vinylidene fluoride). Arkema Inc. Kynar 740—process temperature—240° C.
Comparison was made as well to identical systems where resultant polymer matrix comprised only 2% carbon nanotubes—no cyclic butyleneterephthate employed. Process conditions were the same.
For all, conductivity measurement was by simple 2-probe. Silver paint was used to ensure good contact.
FIG. 6 shows that for each resin matrix, the system containing cyclic butylene terephthalate shows conductivity about as good or better than the system without cyclic butylene terephthalate.

Example 10

Carbon nanotube/cyclic butylene terephthalate composite of Example 7 was melt compounded into Polyamide-12 on a DSM midi extruder at 150 rpm for 10 minutes at 285° C. The carbon nanotube/cyclic butylene terephthalate composite of Example 8 was melt compounded into Polyamide-12 on the DSM midi extruder at 150 rpm for 10 minutes at 285° C.
FIG. 7 shows that the conductivity of polymer matrix of Example 8 is approximately two orders of magnitude higher than that of Example 7. The process of manufacture of a carbon nanotube/cyclic butylene terephthalate resin matrix has a strong influence on properties.
For the carbon nanotubes/cyclic butylene terephthalate resin matrix produced on a DSM midi-extruder, the combined effect of screw speed, temperature, and time can be configured as the total amount of work applied to the matrix. Less work results in better performance. Higher screw speed increases shear rate (i.e., more work), higher temperature reduces shear rate (i.e., less work), and lower time decreases amount of shear (i.e., less work). The above results are obtained with a matrix that was 25% carbon nanotubes, however, the phenomenon should in no way be limited to that specific resin matrix. Moreover, the phenomenon should in no way be limited to the type of extruder or mixing system employed. Work levels established on one type of extruder can be applied to another type of extruder by one skilled in the art.
For the DSM midi-extruder (15 cm³ volume), employed in the above examples, a work level that was acceptable was one that was lower than the work level established by: temperature greater than or equal to 150° C., a screw speed less than or equal to 100 rpm and a mixing time less than or equal to 10 minutes. A preferred level was that established by a temperature=150° C., a screw speed equal to 100 rpm, and a mixing time equal to about 2-3 minutes.

Example 11

In several experiments, a carbon nanotube/cyclic butylene terephthalate resin matrix of Example 8 was melt compounded into polycarbonate to give resultant polymer matrixes concentrations of 5% or less carbon nanotubes. A comparison to a polymer matrix with the same concentration of carbon nanotubes—with no cyclic butyleneterephthate was made. See FIG. 5. FIG. 5 shows the overall better performance provided by the presence of cyclic butylene terephthalate exemplified by the lower percolation level and higher ultimate conductivity.

Example 12

Carbon nanotube/cyclic butylene terephthalate resin matrix according to Example 8 was added to a standard thermoset epoxy system such that the resultant concentration of carbon nanotubes was 0.5%. The epoxy was Dow Chemical Co. D.E.R. 331 and Air Products and Chemicals, Inc. Amicure CG-1200. The resin matrix was pre-dissolved in Part A (i.e., D.E.R. 331) at 160° C. for about 12-16 hours prior to curing. For comparison, the same epoxy was prepared with plain carbon nanotubes.
FIG. 8 shows the relative change in performance for the carbon nanotube containing systems versus epoxy polymer with no carbon nanotubes present. The epoxy polymer containing only carbon nanotubes shows an increase in modulus, but a decrease in maximum stress and strain at break. In contrast, the epoxy polymer containing the carbon nanotube/cyclic butylene terephthalate resin matrix shows an improvement in all three areas—both modulus and toughness are increased—an unusual combination. Moreover, dispersion is substantially improved—as seen in the photographs, FIGS. 9a and 9b.
Having described the invention, we now claim the following and their equivalents.

What is claimed is:
1. A polymer composition comprising:
(a) a resin matrix comprising a mixture of cyclic butylene terephthalate resin and about 4 wt % or more, based on said resin matrix, of carbon nanotubes whereby said resin matrix has a conductivity of about $1 \times 10^{-6}$ ohm$^{-1}$cm$^{-1}$ or more, and
(b) a polymer matrix comprising a polymer selected from the group consisting of polyamides, polycarbonates, polyurethanes, polyacrylics, chloropolymers, fluoropolymers, epoxy resin and mixtures, blends, copolymers, terpolymers thereof
wherein said polymer composition is formed by melt mixing said resin matrix and said polymer matrix to provide a polymer composition exhibiting increased conductivity and/or increased mechanical properties.
2. The polymer composition of claim 1 wherein said carbon nanotubes are selected from the group consisting of single-walled carbon nanotubes, double-walled nanotubes, multi-walled nanotubes and mixtures thereof.
3. The resin of claim 1 wherein said cyclic butylene terephthalate has been polymerized.

4. The polymer composition of claim 1 wherein said carbon nanotubes comprise about 0.01 to 25 wt % of said polymer composition.

5. The polymer composition of claim 1 wherein said carbon nanotubes comprise less than about 10 wt % of said polymer composition.

6. The polymer composition of claim 1 wherein said carbon nanotubes comprise less than 5 wt % of said polymer composition.

7. The polymer composition of claim 1 wherein said carbon nanotubes comprise less than about 3 wt % of said polymer composition.

8. The polymer composition of claim 1 wherein said polymer matrix comprises a thermoset polymer.

9. The polymer composition of claim 1 wherein the concentration of said carbon nanotubes in said resin matrix is from about 5 to 25% by weight of said resin matrix.

10. The polymer composition of claim 1 wherein the concentration of said carbon nanotubes in said resin matrix is about 25% by weight of said resin matrix.

* * * * *